United States Patent [19]

Hayashi

[11] Patent Number: 5,151,934
[45] Date of Patent: Sep. 29, 1992

[54] KEY TELEPHONE APPARATUS

[75] Inventor: Takashi Hayashi, Kawasaki, Japan

[73] Assignee: Matsushita Electric Industrial Co., Ltd., Osaka, Japan

[21] Appl. No.: 761,853

[22] PCT Filed: Jan. 29, 1991

[86] PCT No.: PCT/JP91/00095
§ 371 Date: Sep. 13, 1991
§ 102(e) Date: Sep. 13, 1991

[87] PCT Pub. No.: WO91/11888
PCT Pub. Date: Aug. 8, 1991

[30] Foreign Application Priority Data

Jan. 30, 1990 [JP] Japan .................. 2-019516

[51] Int. Cl.$^5$ ............................................ H04M 9/00
[52] U.S. Cl. .................... 379/159; 379/165; 379/166
[58] Field of Search ............... 379/157, 158, 159, 165, 379/166, 167; 375/5

[56] References Cited

U.S. PATENT DOCUMENTS 4,996,709 2/1991 Heep et al. ............. 379/159 X
4,998,274 3/1991 Ephraim ................. 379/159 X

FOREIGN PATENT DOCUMENTS 63-290488 11/1988 Japan .
64-77399 3/1989 Japan .

Primary Examiner—Stafford D. Schreyer
Attorney, Agent, or Firm—Stevens, Davis, Miller & Mosher

[57] ABSTRACT

The present invention relates to a key telephone apparatus. In accordance with the present invention, a port for connecting terminal devices comprises two pairs having four wires, one pair having two wires of which is connected to a digital terminal device and the other pair having two wires of which is simultaneously connected to an analog terminal device, and there is provided switching control means for automatically selecting either of an interface circuit for analog terminal device and an interface circuit for digital terminal device connected to this port in accordance with the state of use of terminal devices. Therefore, it is possible to connect a one-pair two-wire analog terminal device and a one-pair two-wire digital terminal device together to one port and select either the interface circuit for analog terminal device or the interface circuit for digital terminal device according to the state of use of terminal devices under surveillance of the switching control means. As a result, the analog terminal device and the digital terminal device can be handled as one terminal device (extension).

1 Claim, 2 Drawing Sheets

KEY TELEPHONE APPARATUS

TECHNICAL FIELD

The present invention relates to a key telephone apparatus capable of handling terminal devices comprising an analog terminal device such as a cordless telephone set and a digital terminal device such as a key telephone set (hereafter referred to as hybrid terminal device) as one terminal device (extension).

BACKGROUND ART

In conventional key telephone apparatuses whereto such hybrid terminal devices can be connected (hereafter referred to as hybrid key telephone apparatuses), an interface circuit for two-wire digital terminal device and an interface circuit for two-wire analog terminal device are connected to an analog terminal device or a digital terminal device by means of switching using a switch or by replacing the interface circuit itself.

FIG. 2 is a configuration diagram of a conventional key telephone apparatus having so-called hybrid terminal devices, i.e., a conventional key telephone apparatus whereto an analog terminal device and a digital terminal device are simultaneously connected by means of switching using a switch. FIG. 3 is a configuration diagram of a conventional key telephone apparatus having a so-called hybrid terminal device, i.e., a conventional key telephone apparatus whereto an analog terminal device and a digital terminal device are simultaneously connected by means of individual interface circuits.

In FIG. 2, numeral 1 denotes a main device of a key telephone apparatus. This main device 1 has both an interface circuit 2 for analog terminal device and an interface circuit 3 for digital terminal device. Numeral 4 denotes an analog terminal device connected to the interface circuit 2 for analog terminal device via a port a, and numeral 5 denotes a digital terminal device connected to the interface circuit 3 for digital terminal device via a port c. A port b is a so-called hybrid port which is connected to the interface circuit 2 for analog terminal device (as illustrated) by means of switching in an interacting switch 7 when a terminal device 8 is an analog terminal device and which is connected to the interface circuit 3 for digital terminal device when the terminal device 8 is a digital terminal device.

On the other hand, FIG. 3 shows a hybrid key telephone apparatus whereto the above described analog terminal device 4 and digital terminal device 5 can be connected. In this apparatus, ports d and e are so fixed as to be analog terminal device connection port and digital terminal device connection port, respectively. When a terminal device must be replaced, therefore, the interface circuit 2 for analog terminal device or the interface circuit 3 for digital terminal device may be replaced.

Once setting in the main device 1 is performed in a conventional hybrid key telephone apparatus having the above described configuration shown in FIG. 2 or FIG. 3 according to the terminal device to be connected, however, the port whereto the terminal device is connected is so fixed as to be used for either analog terminal device or digital terminal device, and hence it is extremely difficult for the user to change the setting, resulting in a problem.

DISCLOSURE OF INVENTION

The present invention solves such a problem of the prior art. An object of the present invention is to provide an excellent hybrid key telephone apparatus which makes it possible to connect an analog terminal device and a digital terminal device together to one port, and consequently which makes it possible to handle them as if they form one terminal device (extension).

In accordance with the present invention for achieving the above described object, a port for connecting terminal devices comprises two pairs having four wires, one pair having two wires of which is connected to a digital terminal device and the other pair having two wires of which is simultaneously connected to an analog terminal device, and there is provided switching control means for automatically selecting either of an interface circuit for analog terminal device and an interface circuit for digital terminal device connected to this port in accordance with the state of use of terminal devices.

Therefore, the present invention makes it possible to connect a one-pair two-wire analog terminal device and one-pair two-wire digital terminal device together to one port and select either the interface circuit for analog terminal device or the interface circuit for digital terminal device according to the state of use of terminal devices under surveillance of the switching control means. As a result, the present invention functions to handle the analog terminal device and the digital terminal device as one terminal device (extension).

BEST MODE FOR CARRYING OUT THE INVENTION

Figure 1:
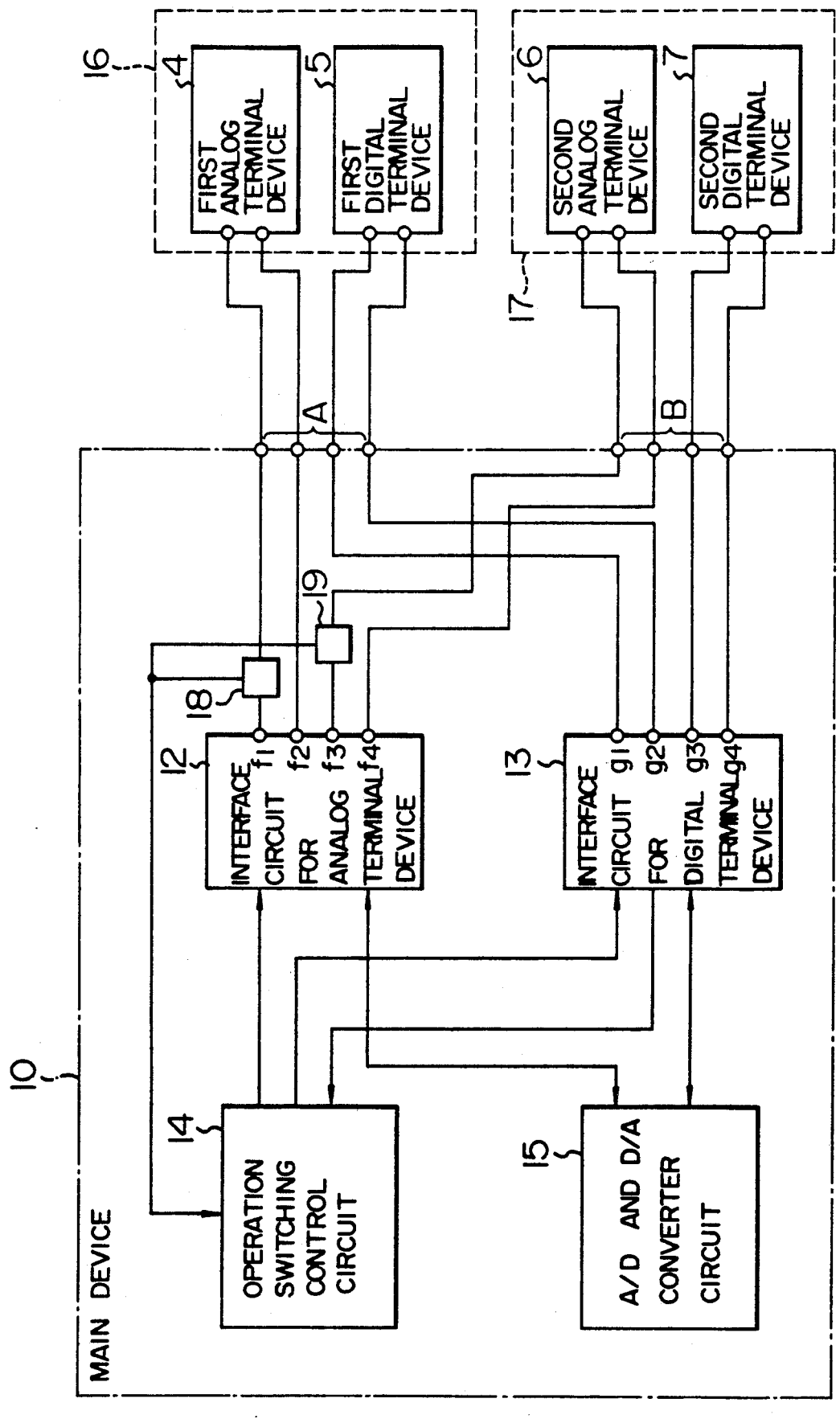
FIG. 1 is a circuit block diagram of a key telephone apparatus in an embodiment of the present invention.
Figure 2:
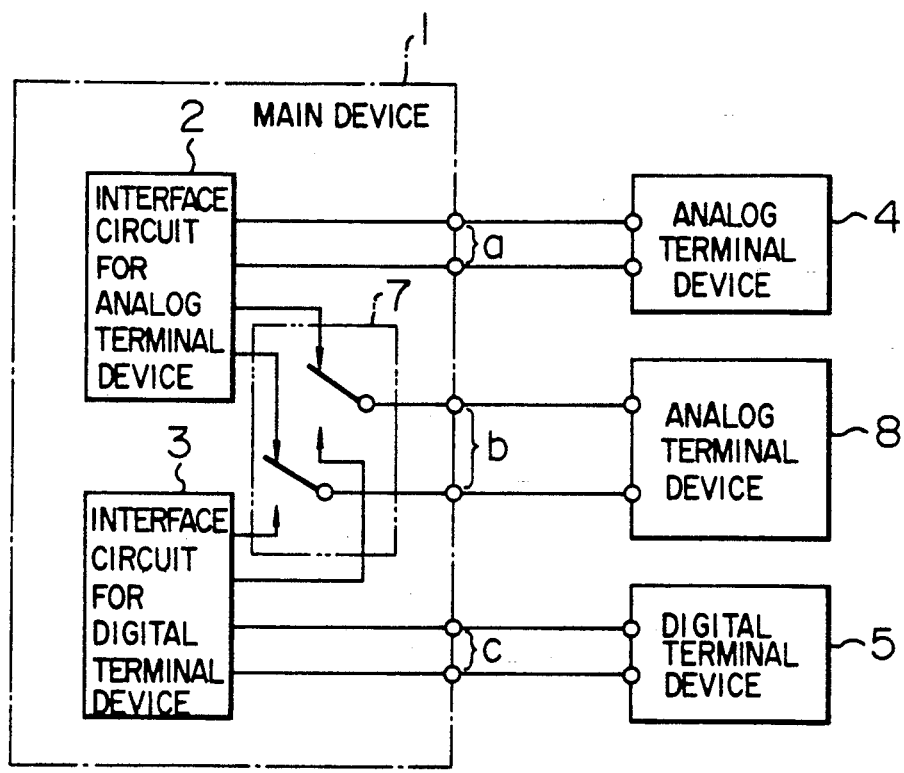
FIGS. 2 and 3 are circuit block diagrams of key telephone apparatuses of the prior art each having a hybrid terminal device.
Figure 3:
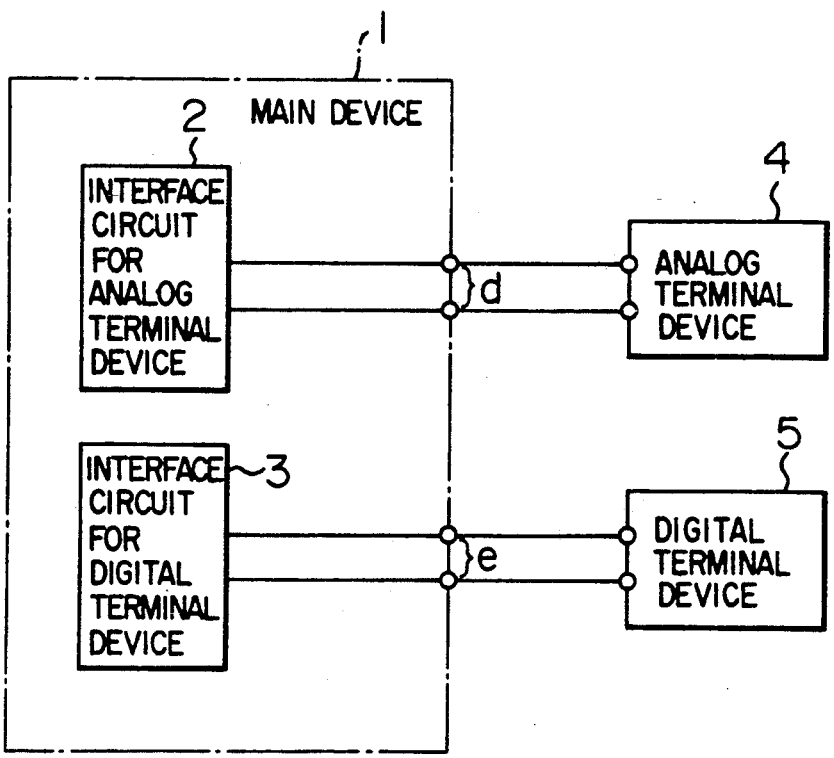

FIG. 1 shows the configuration of an embodiment of a key telephone apparatus according to the present invention. In FIG. 1, the same characters as those of FIGS. 2 and 3 described above denote the same components as those of FIGS. 2 and 3.

In FIG. 1, numeral 10 denotes a main device of a key telephone apparatus comprising an operation switching control circuit (switching control means) 14, an A/D and D/A converter circuit 15, an interface circuit 12 for analog terminal device, an interface circuit 13 for digital terminal device, analog terminal device operation monitoring circuits 18 and 19, and two ports A and B.

The operation switching control circuit 14 controls the switching operation of the interface circuit 12 for analog terminal device and the interface circuit 13 for digital terminal device The A/D and D/A converter circuit 15 has function of converting inputted analog signals into digital signals and outputting the resultant digital signals as well as function of converting inputted digital signals into analog signals and outputting the resultant analog signals. Each of the operation switching control circuit and the A/D and D/A converter circuit 15 is interconnected to the interface circuit 12 for analog terminal device and the interface circuit 13 for digital terminal device The interface circuit 12 for analog terminal device further comprises four terminals f1, f2, f3 and f4 for two pairs having four wires Among them, two terminals f1 and f2 for one pair having two wires are connected to a first analog terminal device 4 such as a cordless telephone set via the analog terminal device operation monitoring circuit 18 and the port A. Two terminals f3 and f4 for remaining one pair having two wires are connected to a second analog terminal device 6 via the analog terminal device operation monitoring circuit 19 and the port B.

Further, the interface circuit 13 for digital terminal device further comprises four terminals g1, g2, g3 and g4 for two pairs having four wires. Among them, two terminals g1 and g2 for one pair having two wires are connected to a first digital terminal device 5 such as a key telephone set via the port A. Two terminals g3 and g4 for remaining one pair having two wires are connected to a second digital terminal device 7 via the port B.

With reference to FIG. 1, the first analog terminal device 4 and the first digital terminal device 5 form a first hybrid terminal device 16 sharing the port A, whereas the second analog terminal device 6 and the second digital terminal device 7 form a second hybrid terminal device 17 sharing the port B.

Operation of the above described embodiment will now be described.

First of all, it is now assumed that all of the terminal device included in the first hybrid terminal device and the second hybrid terminal device are in the nonuser state. If the first analog terminal device 4 connected to the port A, for example, is used in this state, a signal caused by this use (an offhook signal in this case) is detected by the analog terminal device operation monitoring circuit 18, and the detected signal is transmitted to the operation switching control circuit 14. The interface circuit 12 for analog terminal device is thus driven under the control of the operation switching control circuit 14. On the basis of a dial signal transmitted from the first analog terminal device 4, the interface circuit 12 for analog terminal device brings the first analog terminal device 4 to the talk state with the second analog terminal device 6 via the port B or brings the first analog terminal device 4 to the talk state with the second digital terminal device 17 via the A/D and D/A converter circuit 15, the interface circuit 13 for digital terminal device, and the port B.

In such a state of use, the port A is used exclusively by the first analog terminal device 4 and the first digital terminal device 5 sharing the port A cannot be activated. Further, the port B is used exclusively by one of the second analog terminal device and the second digital terminal device, and the other of them cannot be activated.

When all of the terminal devices 4, 5, 6 and 7 are not used, use of the second analog terminal device 6 causes operation similar to that described above.

Further, operation of the first digital terminal device 5 and the second digital terminal device 7 is always monitored by the interface circuit 13 for digital terminal device. Since the detected signals of these operation states are transmitted to the operation switching control circuit 14, the switching operation of the interface circuit 12 for analog terminal device and the interface circuit 13 for digital terminal device is controlled by the operation switching control circuit 14.

As understood from the description given above, a talk between the first analog terminal device 4 and the second analog terminal device 6 in the present key telephone apparatus is made directly via the interface circuit 12 for analog terminal device When the first digital terminal device 5 and the second digital terminal device 7 are to make talk together, it is made directly via the interface circuit 13 for digital terminal device When the first analog terminal device 4 and the second digital terminal device 7 are to make talk together or the first digital terminal device 5 and the second analog terminal device 6 are to make talk together, it is made via the interface circuit 12 for analog terminal device, the A/D and D/A converter circuit 15, and the interface circuit 13 for digital terminal device.

In the present key telephone apparatus, therefore, the first analog terminal device 4 and the first digital terminal device 5 forming the first hybrid terminal device 16 are handled as one terminal device (extension) sharing the port A, and the second analog terminal device 6 and the second digital terminal device 7 forming the second hybrid terminal device 17 are handled as one terminal device (extension) sharing the port B. Therefore, it is impossible that two kinds of terminal devices (the analog terminal device 4 and the digital terminal device 5, or the analog terminal device 6 and the digital terminal device 7) are simultaneously activated or they make a different talk. However, such switching that one terminal device (such as the analog terminal device 4) holds a talk and thereafter the other terminal device (such as the digital terminal device 5) continues that talk can be easily controlled under the action of the operation switching control circuit 14.

INDUSTRIAL APPLICABILITY

As evident from the above described embodiment, one port for connecting terminal devices comprises two pairs having four wires in the present invention. Therefore, one pair having two wires of one port can be connected to a digital terminal device, and the other pair having two wires can be connected to an analog terminal device.

Further, since there is provided switching control means for automatically switching an interface circuit for analog terminal device and an interface circuit for digital terminal device connected to this port in accordance with the state of use of the above described digital terminal device or analog terminal device, two terminal devices connected to one port can be handled just as one terminal device (extension).

Further, in case a key telephone set to be exclusively used for the present key telephone apparatus is connected to one port as the digital terminal and a cordless telephone set used for a general line is connected to the port as an analog terminal device, the user can enjoy various services of the present key telephone apparatus by using the key telephone set. On the other hand, in case the user wants to continue the talk even if the user leaves the set, the talk can be continued by switching it to the cordless telephone set side, resulting in another advantage.

I claim:
1. A key telephone apparatus comprising:
   an interface circuit for analog terminal device including four terminals associated with two pairs having four wires;
   an interface circuit for digital terminal device including four terminals associated with two pairs having four wires;
   a first analog terminal device connected to two terminals of said interface circuit for analog terminal device, said two terminals being associated with one pair having two wires;

a second analog terminal device connected to two remaining terminals of said interface circuit for analog terminal device, said two remaining terminals being associated with remaining one pair having two wires;

a first digital terminal device connected to two terminals of said interface circuit for digital terminal device, said two terminals being associated with one pair having two wires;

a second digital terminal device connected to two remaining terminals of said interface circuit for digital terminal device, said two remaining terminals being associated with remaining one pair having two wires; and switching control means for handling the first analog terminal device and the first digital terminal device as a first hybrid terminal device sharing one port and handling the second analog terminal device and the second digital terminal device as a second hybrid terminal device sharing another port.

* * * * *